United States Patent [19]

Selsdon

[11] Patent Number: 4,832,836
[45] Date of Patent: May 23, 1989

[54] SERIES FILTERS

[76] Inventor: Leslie Selsdon, 41 Cumberland Court, Great Cumberland Place, London W1H 7LG, England

[21] Appl. No.: 178,863

[22] Filed: Apr. 13, 1988

Related U.S. Application Data

[63] Continuation of Ser. No. 902,457, Aug. 18, 1986, abandoned.

[30] Foreign Application Priority Data

Jun. 14, 1983 [GB] United Kingdom ............... 8316162
Jun. 14, 1984 [GB] United Kingdom ............... 8415138
Dec. 18, 1984 [GB] United Kingdom ............... 8431881

[51] Int. Cl.$^4$ .................... B03B 29/24; B03B 27/10
[52] U.S. Cl. ................................ 210/133; 210/443; 210/168; 210/254; 210/434; 123/196 R; 184/6.24
[58] Field of Search ............... 123/196 A, 196 R; 184/6.21, 6.24; 210/90, 130, 133, 168, 254, 335, 429, 434, 443, 490, 502.1, 741

[56] References Cited

U.S. PATENT DOCUMENTS

| | | | |
|---|---|---|---|
| 2,568,196 | 9/1951 | Kennedy | 210/DIG. 17 |
| 2,843,268 | 7/1958 | Kennedy | 210/DIG. 13 |
| 4,032,447 | 6/1977 | Douglass | 210/168 |
| 4,048,071 | 9/1977 | Yamada et al. | 210/90 |
| 4,534,861 | 8/1985 | Wedemeyer et al. | 210/168 |
| 4,608,173 | 8/1986 | Watanabe et al. | 210/502.1 |

FOREIGN PATENT DOCUMENTS

| | | |
|---|---|---|
| 67036 | 1/1980 | Italy . |
| 0399143 | 1/1932 | United Kingdom . |
| 787408 | 12/1957 | United Kingdom . |
| 965328 | 7/1964 | United Kingdom . |
| 1054646 | 1/1967 | United Kingdom . |
| 1133858 | 11/1968 | United Kingdom . |
| 1133859 | 11/1968 | United Kingdom . |
| 1280357 | 7/1972 | United Kingdom . |

Primary Examiner—Frank Spear
Attorney, Agent, or Firm—Cushman, Darby & Cushman

[57] ABSTRACT

A filter unit including a housing element having a first and a second inlet for fluid and a first and a second outlet for fluid, flow passages defined in the housing defining a first path of flow for fluid between the first inlet and the first outlet of the housing, a flow passage defined in said housing defining a second path of flow for fluid between the second inlet and the second outlet of the housing, and a filter member in housing being capable of filtration to remove particles of dimensions greater than 5 micrometers, the second path of flow including a path through the filter and a by-pass about the filter having a resistance to flow of fluid no greater than that of the filter whereby in normal use a proportion only of fluid passing through the second flow path passes through the filter, provides fine filtration for an internal combustion engine and is attachable to a conventional engine filter mount.

12 Claims, 8 Drawing Sheets

SERIES FILTERS

This is a continuation of Ser. No. 902,457, filed Aug. 18, 1986, now abandoned.

BACKGROUND OF THE INVENTION

This invention relates to filters and primarily but not exclusively to the field of filtration of lubricating oil used in internal combustion engines, but is not restricted to such use and may be utilised in other contexts.

It is conventional, in the filtration of lubricating oil used in internal combustion engines, to provide a so-called full-flow filter unit. This receives oil under pressure from the usual oil flow circuit of the engine and the flow of oil is directed through a filter unit having flow paths of such small dimensions that particles of foreign matter, especially carbon, are trapped by the filter unit, whereby the oil returns to the system in a considerably cleaner state. In order to obtain adequate treatment of the total quantity of oil available in the lubricating system of the engine, it is necessary for practical purposes to ensure that there is a relatively rapid flow of oil through the filter unit, say of the order of 2 gallons per minute. Such a rapid flow, with filtration down to say 25 microns, hereinafter referred to for convenience as "full-flow", is not compatible (in a filter unit of a practicable small size) with filtration in a filter unit of very small porosity, say of the order of 1 micron, hereinafter called for convenience "micron" filtration. Nevertheless, as there is a considerable content of such very small particles in engine oil, it is desirable to be able to remove such particles by micron-size filtration if at all possible.

British Patent Specification No. 1236805 (Russo) described the use of a paper tissue roll as a filtering medium. As will be discussed below, this is a medium suitable for micron filtration of lubricating oil but the specification shows only a full-flow filter based on this material. This would cause excessive back pressure and insufficient flow.

British Patent Specification No. 965328 (Filterwerk) shows a filter unit containing a coarse filter and a "fine filter" arranged in series for full-flow of engine oil. Accordingly it may be deduced that either the "fine filter" is not a micron filter or the filter unit will suffer from the same problems as that of Russo. A by-pass valve is provided enabling oil to by-pass the fine filter if that filter blocks. Normally the by-pass is closed by a spring loaded valve and oil does not flow through the by-pass in normal use.

It has been proposed to provide a micron filter to operate in conjunction with a conventional engine oil filter. This micron filter was a separate unit and meeded to be connected by special drillings made to oil galleries of an engine or by T-connectors inserted in oil lines. Each engine required a different connection technique and the filter was not sufficiently convenient in use to be successful. Also as the arrangement was parallel, unfiltered oil was liable to be presented to the micron filter causing this to become clogged sooner than necessary.

A coarse filter and fine filter arranged in parallel in a single housing has been proposed but this necessarily results in unfiltered oil being presented to the fine filter.

It would accordingly be desirable to provide a filter unit with which a full-flow system may be converted in a quick, simple and inexpensive manner to a system which ensures that a proportion of the total filtered oil flow is always undergoing finer, e.g. micron-size filtration.

SUMMARY OF THE INVENTION

The present invention provides a filter unit comprising a housing element having a first and a second inlet for fluid and a first and a second outlet for fluid, means in said housing defining a first path of flow for fluid between the first inlet and the first outlet of the housing, means in said housing defining a second path of flow for fluid between the second inlet and the second outlet of the housing, and a filter member in said housing capable of filtration to remove particles of dimensions greater than 5 micrometers, said second path of flow including a path through said filter and a by-pass about said filter having a resistance to flow of fluid no greater than that of said filter whereby in normal use a proportion only of fluid passing through the second flow path passes through said filter.

In another aspect the invention includes filtration apparatus comprising means defining a flow path between an inlet and an outlet for fluid to be filtered, said flow path containing in series a coarse filter for treating at least substantially all of the fluid passing through the flow path and a fine filter capable of removing particles of 5 micrometers and greater, wherein the flow path includes a by-pass around said fine filter for a proportion of fluid passing through the flow path which by-pass offers no greater resistance to flow than said fine filter.

Preferably, the filter is capable of removing particles of greater than 1 micrometer from a fluid such as engine oil.

When the unit is positioned in series with a conventional full-flow filter, that proportion of the filtered liquid passing through the full-flow filter unit which cannot pass through the micron filtration path, due to the relative constriction of the latter, is enabled to flow more easily unhindered through the by-pass path.

It should be noted that the by-pass path is not an emergency path closed in normal use as in specification No. 965328 but is part of the normal flow path through the unit. Generally the resistance to flow of the by-pass path will be such that most of the fluid passing through the unit takes this route.

Preferably, the resistance to flow of the by-pass and of the micron filter are so balanced that lubricating oil (e.g. SAE 20/50) will flow through these routes in the volume ratio of at least 5:1, preferably about 10:1.

The by-pass may include a flow restrictor means, which may be variable and resiliently loaded in a manner to tend to increase restriction of flow, e.g. a valve element urged towards a valve seating by resilient loading. The variable type of restrictor may close the by-pass path when the unit is not in use. Alternatively, the flow restrictor means may be permanently open and either variable or fixed in its degree of restriction.

The invention may be embodied in two principal forms namely an auxiliary unit for use as a converter between a separate coarse filter and its normal mounting, and secondly a filter containing both coarse and fine filter elements.

In a converter type embodiment, preferably the second outlet is disposed adjacent to the first inlet, and the first outlet is disposed adjacent to the second inlet, for ease of connection to a conventional filter mount and full-flow filter respectively.

A common form of filter mount comprises a body having a connecting surface with openings communicating with a supply conduit and a return conduit, and a threaded stem projecting centrally of said surface to receive a threaded sleeve on a connecting surface of the filter unit which in turn has openings for the liquid inlet and outlet. Advantageously the auxiliary filter unit body has corresponding connector surfaces.

Advantageously, said means bounding a second path of flow has an internally threaded bore at said second inlet and an externally threaded stem at said second outlet, and in a convenient arrangement said first inlet and second outlet are at a first end face of the housing, and said first outlet and second inlet are at a second opposed end face of the housing, said bore and said stem being at respective ends of a tubular member extending between the end faces of the housing, said filter and optionally said by-pass being coaxial with said tubular member. The auxiliary body can thus be interposed between such a filter mount and such a filter unit without modification of either.

In a first preferred construction, the by-pass flow path is defined by a plurality of radial slots in an annular member disposed about a central sleeve of the filter unit, and a micron-size filter element is disposed annularly externally of the annular member.

In another embodiment said housing has a removable end cap carrying said filter, and said by-pass is advantageously constituted by a plurality of passages bounded by a finned spacer member and said filter disposed about said spacer member.

Accordingly, to the second major aspect of the invention the housing unit is part of a filter housing also containing a coarse filter.

Preferably, the housing comprises a mounting plate member having an axially located threaded bore for mounting on a complimentary threaded stem and constituting said second outlet and having one or more fluid inlet passageways constituting said first inlet, a body portion closed at one end and mounted on said mounting plate member at the other and an axially extending tube extending from adjacent the said closed end of the body portion to said threaded bore.

Such a filter unit preferably is adapted simply to replace a conventional disposable screw-on engine oil filter.

Preferably, the body portion is snap fitted to the mounting plate by engagement of snap coupling elements provided on the body portion and mounting plate.

The body portion, mounting plate member and tube are each and all preferably formed from a plastics material e.g. by injection moulding. Preferably this is sufficiently resistant to oil and heat that the unit is suitable for use as a an engine oil filter. A particularly preferred material is a suitable grade of nylon, such as MARANYL (a trade mark of ICI Plc). The plastics material may be fibre reinforced.

Preferably, the by-pass is provided by one or more axially running external grooves in the tube.

Preferably, the coarse filter coaxially surrounds the tube adjacent the mounting plate member and the said filter capable of filtering 5 micrometer particles coaxially surrounds the tube between the coarse filter and said closed end.

Preferably, the filter employed according to either type of embodiment (the finer filter in the second type) comprises rolled paper tissue.

The filter may comprise tissue enclosed within mesh.

The invention includes a method of filtering a fluid comprising passing the fluid through a filter unit according to the invention such that the fluid passes through the said filter and the by-pass path.

In particular the invention includes such a method applied to filtering engine lubricating oil.

BRIEF DESCRIPTION OF THE DRAWINGS

In order that the nature of the invention may be readily ascertained, embodiments of filter unit in accordance therewith are hereinafter particularly described with reference to the accompanying drawings, wherein.

DETAILED DESCRIPTION OF THE PRESENTLY PREFERRED EXEMPLARY EMBODIMENTS

Figure 1:
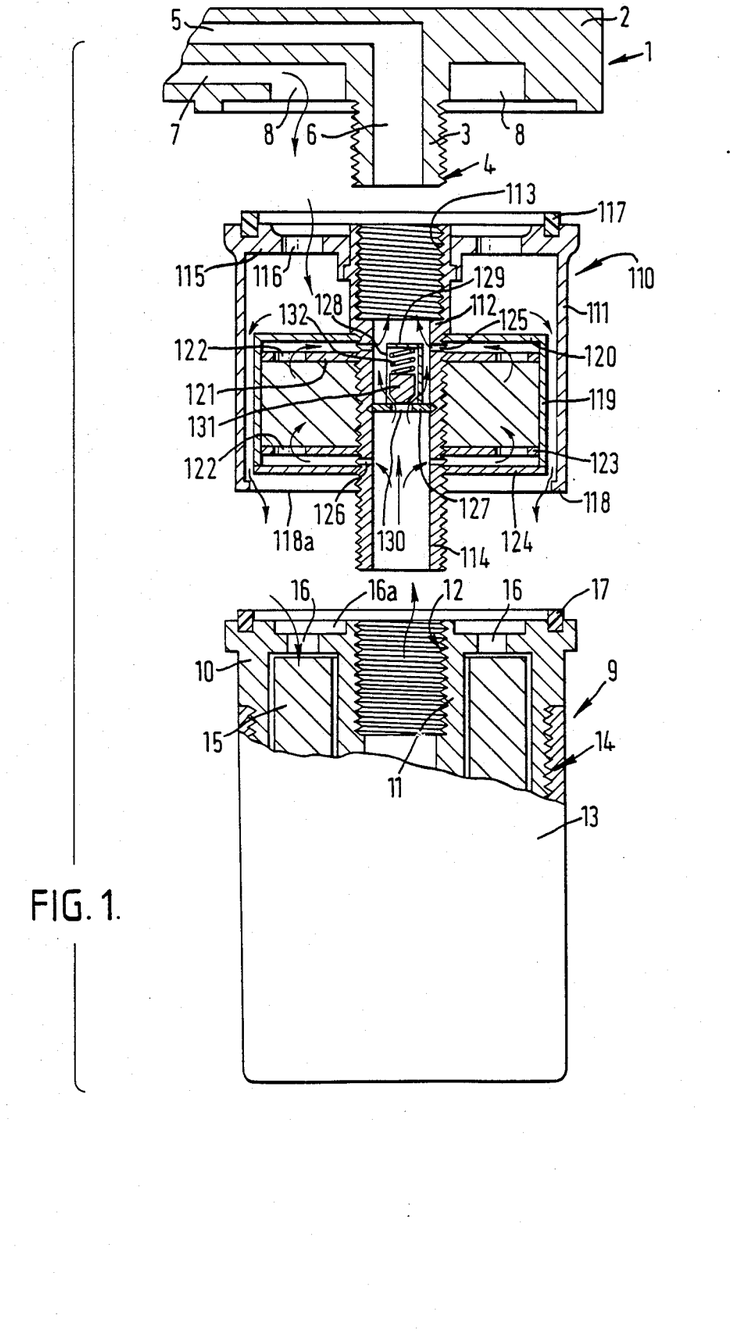
FIG. 1 is a composite view, with the various items shown in axially separated condition, of a representative filter mount, a first embodiment of an auxiliary filter unit, and a conventional full-flow filter unit.

Referring to FIG. 1, the conventional filter mount 1 comprises a body 2 having a central stem 3 with an external screw-threading 4. A first internal conduit 5 leading from the oil flow system of the engine communicates with a central inflow passage 6 of the stem 3. A second internal conduit 7 opens at the underside of the body 2 at openings 8,8 for outflow of filtered oil back from the engine.

A conventional full-flow oil filter unit 9 comprises a body 10 having a central sleeve 11 which is internally threaded at 12, to correspond to the external threading 4 of the stem 3. A cup 13 is threaded onto the body 10 at 14. The sleeve 11 extends almost to the base of the cup 13 but stops short of the base of the cup. About the sleeve 11 is disposed an annular full flow filter element 15. The body 10 has openings 16 positioned to correspond to the openings 8,8 of the filter mount 1. A gasket 17 is disposed in a recess at the upper face of the body 10, to abut against the underside of the body 2 of the mount.

In normal use, the filter unit 9 is engaged onto the mount 1 by threading the sleeve 11 onto the stem 3 until the filter unit is sealed to the mount by the gasket 17. Oil is fed under pressure from the engine via the conduit 7 and into the openings 16 to flow through the filter element 15, and back to the engine via the sleeve 11 and the conduit 5. As so far described, the construction and operation are representative of the conventional full-flow filter system.

Whilst it is conventional for the flow and return of oil from and to the engine to be as illustrated, an alternative arrangement would be to have the flow through conduit 5 and the return through conduit 7. FIGS. 3 to 8 deal with such a reverse of the conventional arrangement.

Referring to FIG. 1, there is shown an auxilliary filter unit 110 which has a generally cup-shaped body 111 coaxially surrounding a tubular member 112 having at its upper end a widened bore which is threaded at 113 to receive the threaded stem 3 of the filter mount. Below the internally threaded portion 113 the tubular member is of reduced diameter and externally threaded, terminating in an externally threaded portion 114 to provide a stem portion capable of threaded engagement in the central sleeve 11 of the filter unit 9.

The body 111 comprises a cylindrical wall terminating in a transverse wall 115 in which are provided apertures 116 which, in use, communicate with apertures 8 of the filter mount 1. An annular gasket 117 is positioned to about and seal against the body 2 of the filter mount 1. The cylindrical wall of the body 111 terminates in an inwardly extending annular flange 118, the body otherwise being open at this end at 118a. Within the body 111 is provided a cup-shaped member 119 having a cylindrical wall and at its upper end as seen in the drawing a transverse end wall 120 having a central threaded aperture screwed down the tubular member 112 to about the annular shoulder formed between the larger and reduced diameter portions of the tubular member. A first bulk head 121 in the form of a circular wall member having a central threaded aperture and outwardly thereof a plurality of smaller apertures 122 is screwed down the external thread of the tubular member 112 sealing against the cylindrical wall of the member 119 to be slightly spaced from the transverse wall 120. A filter material in the form of a roll of paper tissue coaxially surrounds the tubular member 112 immediately below the bulk head 121. A second bulk head 123 similar to bulk head 121 and also including apertures 122 is screwed down the external thread of the tubular member 112 to compress the filter material and once again to seal against the wall of the member 119.

The member 119 may be truly cylindrical in shape but more preferably tapers somewhat, e.g. by from 2 to 5 degrees, toward the wall 120 so that the filter material, if inserted as a cylindrical roll, is under increasing compression as the bulk head 121 is approached.

The member 119 is closed by a transversely extending third bulk head 124 not containing apertures 122, again screwed down the externally threaded portion of the tubular member 112.

A plurality of transverse bores 125 are provided in the tubular member 112 between the transverse wall member 120 and the first bulk head 121 and similar bores 126 are provided through the tubular member 112 between the bulk head 123 and the final bulk head 124.

Contained within the central bore of the tubular member 112, snap fitted into an annular groove therein is a radially extending spider member 127 extending upwardly from which is a cage of rod members 128 terminated by base closure 129. The spider member 127 has a central aperture 130 and the cage contains a valve member 131 biased to close the aperture 130 by a coil spring 132.

In use, oil flows from the engine through conduit 7 through openings 6 into openings 116 of the auxiliary filter unit, passes around the outside of the member 119 to exit the auxiliary filter unit through the open base thereof and enter and pass through the conventional coarse filter in the normal manner. Oil exiting the coarse filter through the central sleeve 11 re-enters the auxiliary filter unit through the tubular bore of member 112. A lesser part of the oil flow proceeds through openings 126 to enter the member 119 and passes through openings 122 in bulk head 123, through the filter material, out through openings 122 in bulk head 121 and re-enters the tubular member 112 through apertures 125. A larger part of the oil depresses the valve member 131 against its spring 132 and passes through the aperture 130. The oil flows come together below the valve member 131 and exit the auxiliary filter unit and re-enter the engine to flow down conduit 5.

Figure 2:
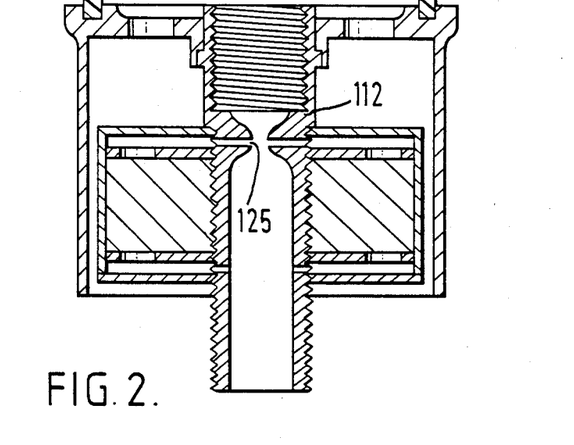
FIG. 2 is an axial section of a second embodiment of an auxiliary filter unit.

A modified form of auxiliary filter unit is shown in FIG. 2 which is similar to that shown in FIG. 1 with the exception that the valve arrangement within the bore of the tubular member 112 is omitted. Instead, tubular bore 112 is narrowed at the exit of bores 125 to form a venturi. The venturi constitutes a fixed flow restriction for oil flowing directly down the passageway in tubular member 112 and further acts to provide suction to draw oil through the filter material by the alternative pathway.

Figure 3:
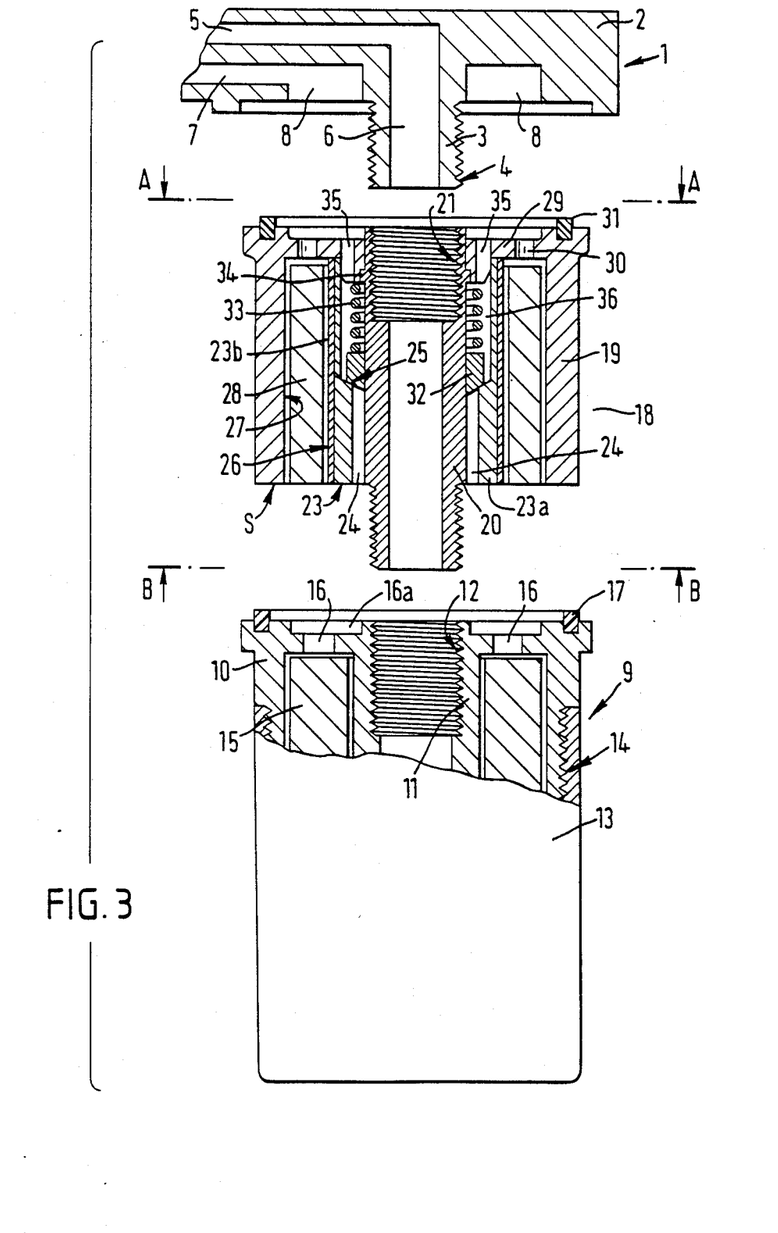
FIG. 3 is a composite view, with the various items shown in axially separated condition, of a representative filter mount, a third embodiment of an auxiliary filter unit, and a conventional full-flow filter unit.
Figure 4:
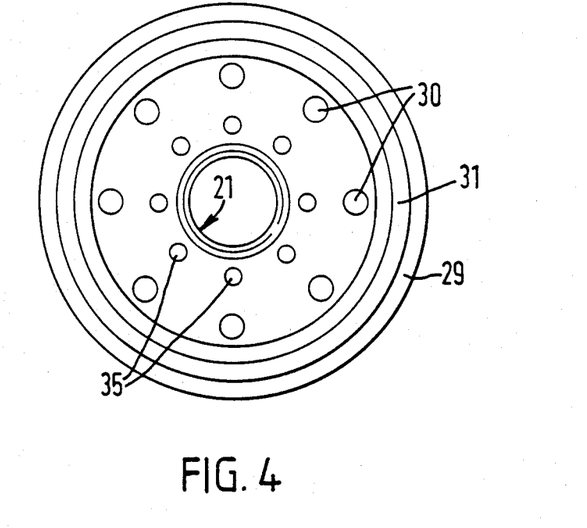
FIG. 4 is a plan view of the auxiliary filter unit, seen in the direction of the arrow "A" in FIG. 3.
Figure 5:
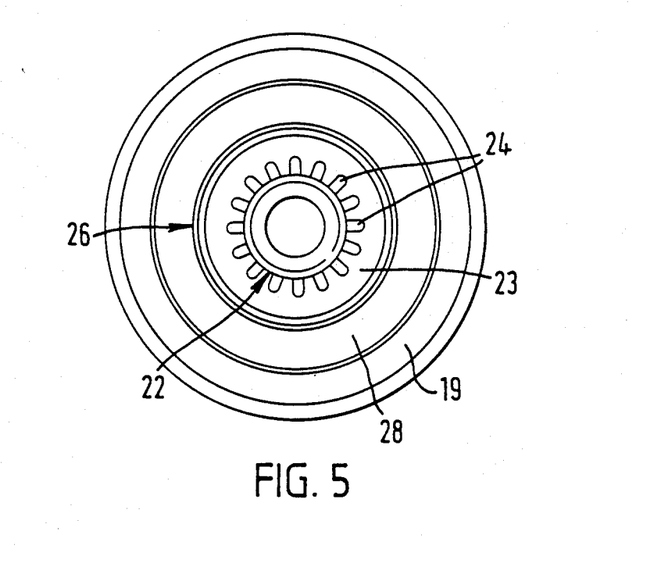
FIG. 5 is an underplan view of the auxiliary filter unit, seen in the direction of the arrow "B" in FIG. 3.

Referring to FIGS. 3 to 5, there is shown an auxiliary filter unit 18 for use where the engine oil flow is the reverse of that which is conventional. The unit 18 has a body 19 provided axially with a tubular member 20 having at its upper end a widened bore which is threaded at 21 and is adapted to receive the threaded stem 3 of the filter mount. At its lower end the tubular member 20 is reduced in external diameter and is threaded at 22 to provide a stem portion capable of threaded engagement into the central sleeve 11 of the filter unit 9. About the intermediate central portion of the tubular member 20 there is disposed an annular valve seat element 23 having a thick-walled lower portion 23a and a thin-walled upper portion 23b. The lower portion 23a is provided with a plurality of axially-running radial slots 24 (best seen in FIG. 3), to provide an oil flow passage. Where the lower portion 23a joins to the upper portion 23b, there is provided a conical valve seating 25. Radially externally of the valve seat element 23 there is provided a tubular sleeve 26, and between the sleeve 26 and the surface 27 of the body 19 there is formed an annular space which receives a removable filter element 28, which may be a roll of paper. The upper end of the body 19 includes a transverse wall 29 in which are provided apertures 30 which, in use, communicate with the apertures 8 of the filter mount 1. An annular gasket 31 is positioned to abut and seal against the body 2 of the filter mount 1.

Within the upper portion 23b of the valve seat element 23 there is disposed a movable flow restrictor and by-pass valve element 32 which is resiliently urged towards the valve seat 25 by a compression spring 33 abutting a rib 34 on the tubular member 20.

A plurality of openings 35 (see FIG. 2) are provided in the transverse wall 29 to provide a communication between the space 36, containing the valve element 32, and the exterior of the upper end of the body 19.

The whole of the auxiliary filter unit 18, other than the filter element 28. may be a multi-part injection moulding of, for example, the plastics material manufactured by I.C.I. under the name MARANYL-391.

In use, the auxiliary filter unit 18 is interposed between the filter mount 1 and the conventional full-flow filter unit 9. For this purpose, the auxiliary filter unit 18 is engaged onto the stem 3, but its own threading 21, and is tightened until the gasket 31 has sealed against the mount body 2. Then the full-flow filter unit 9 is engaged onto the threading 22 of the auxiliary unit 18, and is tightened until the gasket 17 is sealed against the lower end surface "S" of the body 19.

When oil is fed under pressure through conduit 5, it passes down centrally through the stem 3, through the tubular member 20 of the auxiliary filter unit 18, and through the sleeve 11 of the full-flow filter unit 9, whereafter it returns upwardly through the filter element 15 of the full-flow filter, and through the openings 16 to enter the annular chamber 16a communicating with the filter element 28 of the auxiliary filter.

The filter material employed in FIGS. 1 and 2 and in filter element 28 is constructed to have a filtering action which is many times more effective than that of the element 15 of the full-flow filter unit. By way of example, the auxiliary filter element 28 may be arranged to have a filtration action effective to trap particles of about 1 micron diameter, which may be some one-twentieth to one-twenty-fifth of the smallest size of particle which will be trapped by a conventional full-flow filter. A further advantage is that the micron size filter can also remove water which may present in emulsion with the oil.

At the oil flow pressures which are normally available in an internal combustion engine, the rate of flow through the auxiliary filter elements shown would be quite slow, and would be insufficient for adequate treatment of the oil flow if that were the only filtration path provided. In other words, merely substituting a micro-size filter element for an existing full-flow filter element in a conventional filter unit 9 would not permit sufficient oil to flow through the filtration system per unit of time.

With the arrangement including the auxiliary filter unit of the present invention, there is comparatively rapid flow of oil through the filter element 15 of the full-flow filter unit, followed by a much slower passage of a proportion of the oil through the filter element of the auxiliary unit. To compensate for the difference in rates of flow, the balance of the oil flow is by-passed, for instance referring to FIG. 4 axially through the plurality of radial slots 24, then past the spring-loaded restrictor valve element 32 and its seating 25, then through the space 36 and the openings 35, to the openings 8 and back to the return flow conduit 7. Thus, the total return flow consists of a relatively small proportion of micron-filtered oil passing through the element 28 and the apertures 30, and a relatively larger proportion of full-flow filtered oil passing through the by-pass route.

There is thus obtained the benefit that, whereas the full-flow routine is maintained substantially unaltered, a proportion at least of the oil is continuously subjected to a micron-size filtration.

The viscosity of the oil tends to lessen with rise of temperature. When the oil is cold and comparatively viscous, the by-pass valve 32,25 can open further against its spring-loading, and when the oil thins with higher temperature, the valve 32,25 can partially close accordingly.

Figure 6:
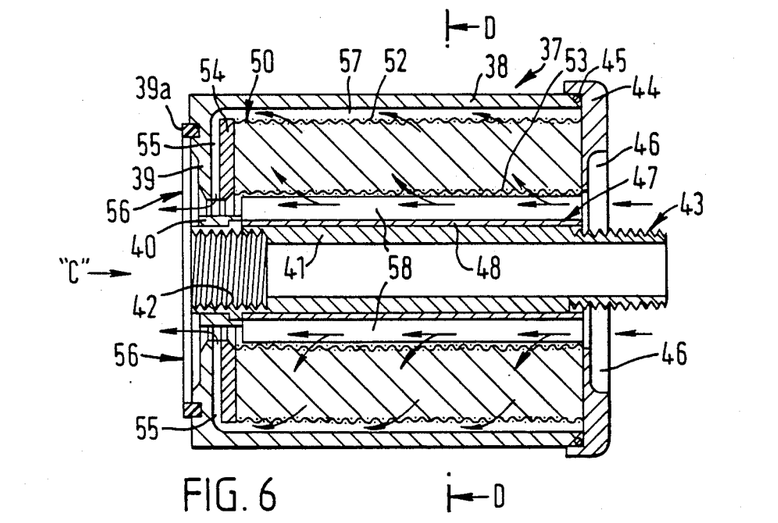
FIG. 6 is a composite view, with the various items shown in axially separated condition, of a representative filter mount, a fourth embodiment of an auxiliary filter unit, and a conventional full-flow filter unit.
Figure 7:
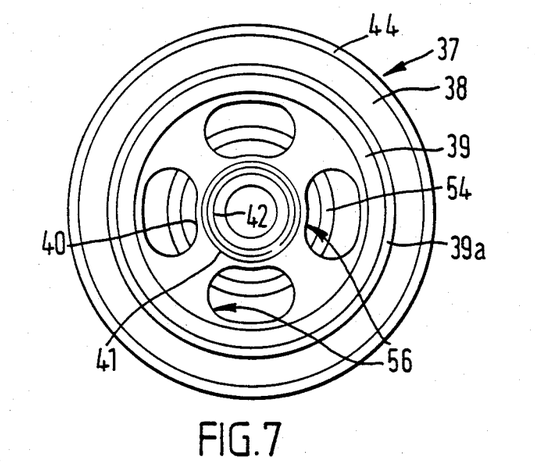
FIG. 7 is an end elevation of the auxiliary filter unit of FIG. 6, viewed in the direction of the arrow "C" in FIG. 6.
Figure 8:
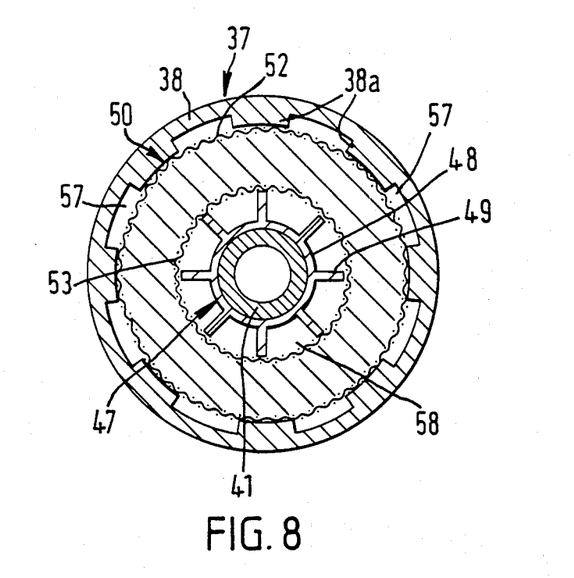
FIG. 8 is a radial section of the auxiliary filter unit of FIG. 6, taken on the line "D—D" of FIG. 6.

Referring now to FIGS. 6 to 8, there is shown a further embodiment of auxiliary filter unit 37 which can be interposed between a filter mount 1 and a full-flow filter 9 in the same manner as has been described above for the embodiment of FIGS. 3 to 5.

The unit 37 comprises a cylindrical body 38 having at one end a transverse wall 39 in which there is an annular recess receiving a sealing gasket 39a to seat, when in use, against body 2 of the filter mount 1. Centrally the wall 39 has a short sleeve portion 40 in which is secured a tubular member 41 having at that end a widened bore which is threaded at 42 to be engaged on the threaded stem 3 of the filter mount. At its other end, the tubular member 41 is reduced in external diameter and has a thread 43 to provide a stem portion capable of threaded engagement into the central sleeve 11 of the filter unit 9.

At the other end of the body 38 there is provided an end cap 44 which is sealed with respect to the body 38 by means of an O-ring 45. The end cap has an opening, or a plurality of openings, 46 to provide a communication path, when in use, between the return-flow openings 16 of the full-flow filter unit 9, and the interior of the body 38.

About the tubular member 41 there is engaged a spacer member 47 having a tubular element 48 from which project a plurality of radial fins 49. The spacer member 47 abuts at one end against the sleeve portion 40, and at the other end against the end cap 44. Secured to the inwardly facing surface of the end cap 44 there is an annular micron-size filter element 50 consisting, for example, of tissue material 51 enclosed between concentric cylindrical walls 52,53 of wire mesh. At its end remote from the end cap 44, the filter element has an end wall 54 which is spaced from the transverse wall 39 so as to leave a flow path 55 communicating with openings 56, in the wall 39, which when in use communicate with openings 8 of the filter mount 1. The filter unit is seated within ribs 38a of the cylindrical body 38 between which are defined flow paths 57 leading the the flow path 55.

When the auxiliary filter 37 is in use, oil under pressure fed from the engine passes through tubular member 41 to the conventional filter unit 9. The return flow from the unit 9 enters the auxiliary unit 37 through the openings 46 and passes into the flow path 58 bounded by the tubular element 48, the fins 49 and the inner wire mesh wall 53 of the auxiliary filter. There is a constriction formed between the end wall 54 of the auxiliary filter and the short sleeve portion 40, and this results in a proportion of the total flow in the flow path 58 being forced through the filter element 50 and into the flow path 57, to rejoin the main flow via the flow path 55.

It will be seen that one or more further auxiliary filter units, such as 18 or 37, may be connected in series with each other, between the filter mount 1 and the full-flow filter unit 9, so that the user can choose to position as many as he wishes in the circuit, provided that adequate external room is available.

The auxiliary filter units shown in FIGS. 1 and 2 have the considerable practical advantage that either can be fitted to conventional filter mounts 1, and used with conventional full-flow filter units 9, without any modification whatsoever of those two items. Thus, where a motor vehicle engine is fitted with a conventional full-flow filter unit, the user can, after delivery, simply unscrew the full-flow unit and insert an intermediate auxiliary filter unit, and then reattach the full-flow unit. Where the oil flow is the reverse of the conventional, a unit such as is shown in FIGS. 3 to 8 can be used in the same way.

Figure 9:
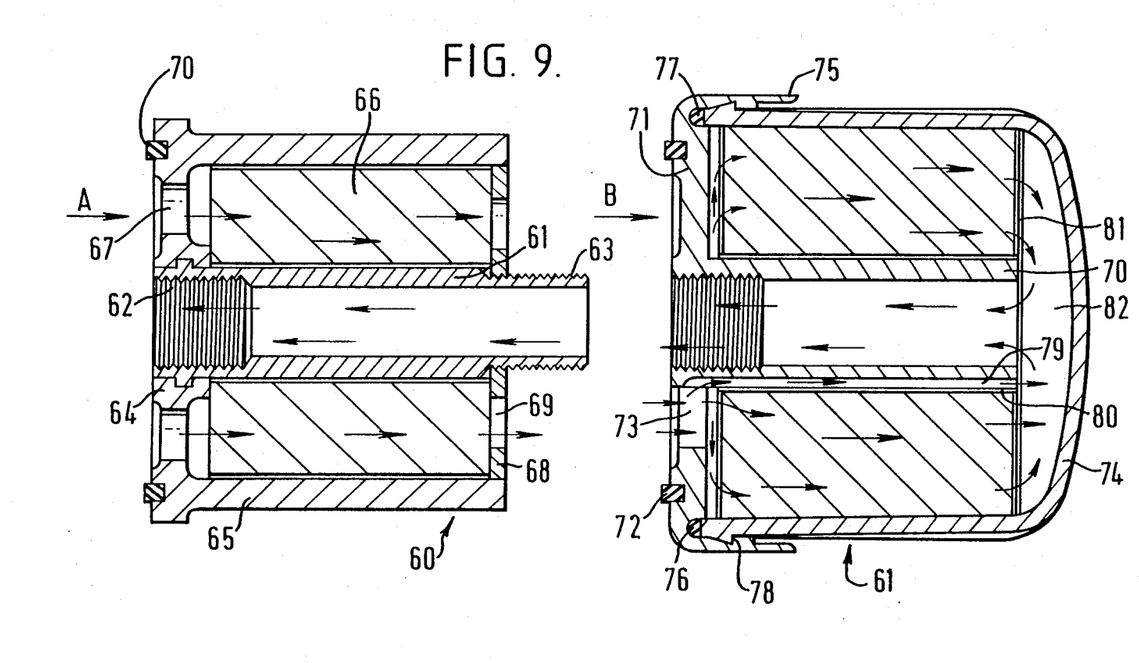
FIG. 9 is a composite view with the various components shown axially separated and in radial section, of a coarse filter and a unit according to a fifth embodiment of the invention.
Figure 10:
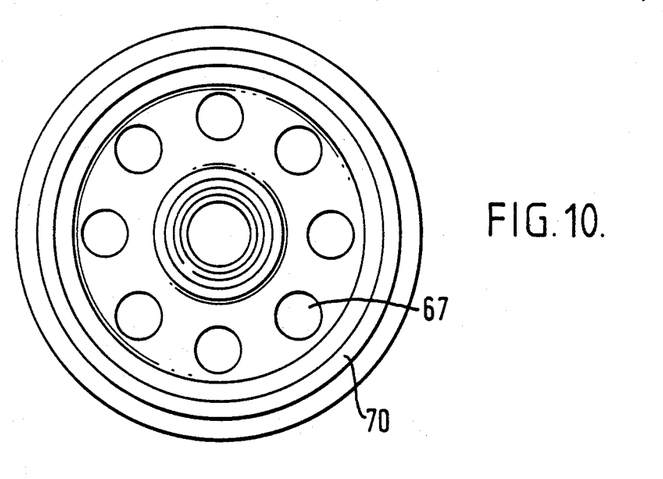
FIG. 10 is an underplan view of the coarse filter of FIG. 9 as seen along arrow 'A' of FIG. 9.
Figure 11:
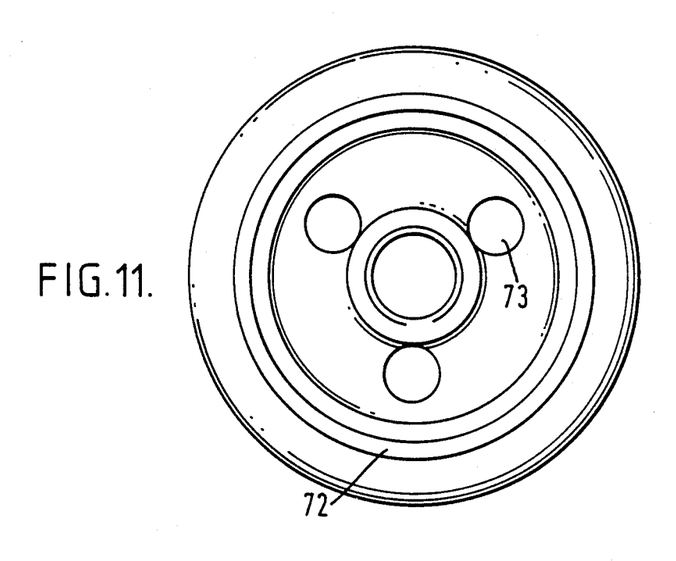
FIG. 11 is an underplan view of the unit of the invention of FIG. 9 as seen along arrow 'B' of FIG. 9.

FIG. 9 illustrates some alternative type of auxiliary filter unit according to the invention. As shown in FIG. 9 a composite filtration unit comprises a coarse filtration unit 60 and a unit according to the invention 61. The coarse filtration unit 60 is adapted to mount on a conventional mounting stem of a conventional filter mount. The coarse filter unit 60 comprises a central tubular member 61 having at one end an internally threaded bore 62 for threaded engagement with the filter mount of the engine. At its opposite end the tubular member 61 has a reduced diameter externally threaded portion 63 for connection to the unit according to the invention 61. A circular wall member 64 has a central aperture containing an annular recess which is snap fitted over a corresponding annular bead formed on the tubular member 61 in the region of the internal thread 62. The wall 64 has integral therewith a cylindrical housing 65 containing a coarse filtration material 66. Access to the coarse filtration material 66 is provided by apertures 67 formed in the circular wall 64. An end closure member 68 closes the opposite end of the cylindrical member 65 and has openings 69 through which coarse filtered oil escapes.

As usual, a suitable flexible annular gasket 70 is provided protruding from an annular recess in the wall 64 for sealing against the filter mount of the engine.

The unit 61 according to the invention comprises a central tubular member 70 open at the right most end as seen in the drawing and having an internally threaded portion at its left most end for receiving the threaded portion 63 of the unit 60. Formed integral with the tubular member 70 is a circular end wall member 71 bearing a suitable resilient gasket 72 protruding from an annular recess in the wall 71 and adapted to seal against the end faces of the cylindrical member 65. The cylindrical wall 71 is provided with a plurality of apertures 73 passing therethrough.

An end cap 74 which is generally cup shaped is arranged coaxially with the tubular member 70. A circumambient wall member 75 extends from the periphery of the wall 71 toward the end cap member 74. Immediately inboard of the circumambient wall 75 an annular groove 76 is provided in the wall 71 partially occupied by a sealing gasket 77. The perimeter of the cup shaped member 74 is received in this annular groove compressing the sealing member. The cup shaped member 74 forms a snap coupling with the circumambient wall 75 by virtue of snap interlocking formations 78 provided on these respective members.

The tubular member 70 is provided with a plurality of axially running grooves 79 communicating with the apertures 73 and extending to the free end of the tubular member. A filter material in the form of paper tissue wound on a cardboard former is arranged coaxially over the tubular member 70 and is compressed by the closure member 74. The closure member 74 is of slightly greater diameter where it is connected to the wall 71 than where it overlies the free end of the tubular member 70. Accordingly the compression of the filter material is greatest toward the right hand end of the filter as shown in the drawing. The axially running grooves 79 of the tubular member cooperate with the cardboard former 80 of the filter material to define passageways by-passing the filter material. A disk of mesh, for instance wire mesh 81 is provided at the free end of the tubular member 70 to define the end of the filter material and divide the filter material from an open chamber 82 which naturally is in fluid communication with the bore of the tubular member 70 and also with the flow channels formed by the axially running grooves 79.

In use, oil is received into the unit through the apertures 73 after coarse filtering and passes partially through the filter material to the chamber 82 and partially through the grooves 79 to the chamber 82 and is then returned to the engine through the bore of the tubular member 70.

It can be seen that the filter unit described with reference to FIG. 9 is adapted to be mounted piggy back fashion on a coarse filter to be mounted to a conventional internal combustion engine oil filter mount.

The wall 71 and the closure 74 of the filter unit may be formed by injection moulding a suitable plastics material such as MARANYL.

For the coarse filter, a pleated paper filter element is adequate. The exterior wall and circular end wall 64 may be injection moulded integrally in suitable plastics material whilst the tubular member may conveniently be formed as a steel insert.

Figure 12:
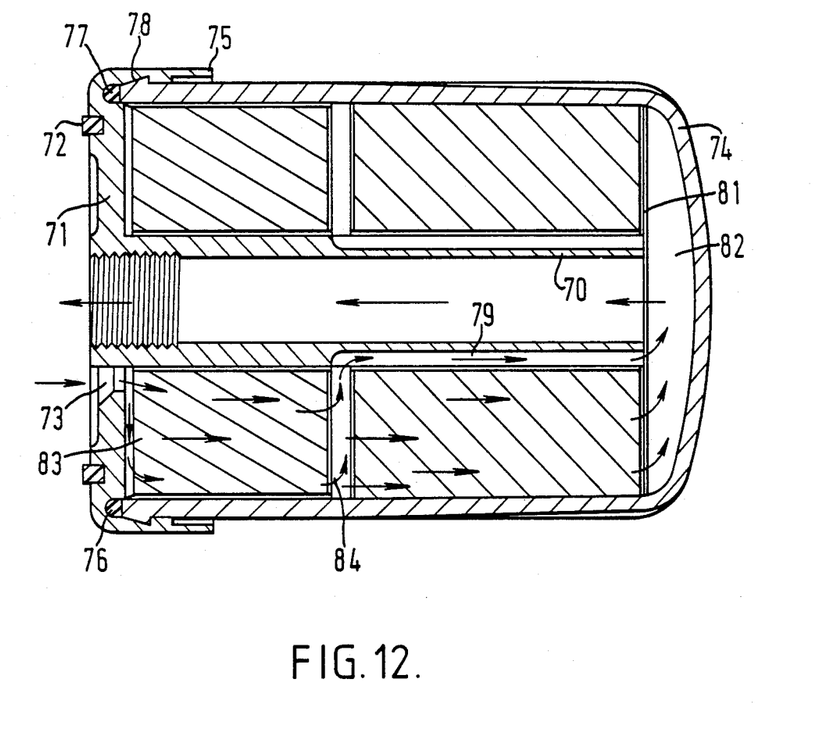
FIG. 12 is a radial sectional view of a sixth unit according to the invention.

Finally, there is shown in FIG. 12 a variant of the filter until shown in FIG. 9 in which the coarse filter is included in the same housing as the fine micron filter. The construction of the filter unit shown in FIG. 12 is generally similar to that of the unit shown in FIG. 9 and like parts are indicated by the same reference numbers. Essentially, compared to FIG. 9 the space to the left of the filter material is extended sufficiently to incorporate a coarse filter material 83 such as a pleated paper filter which is interposed between the apertures 73 and the commencement of the grooves 79. The coarse filter material 83 is separated from the fine filter material by a support grid 84. The filter is adapted to be mounted to a conventional engine filter mount as a direct replacement of the conventional coarse filter so as to provided coarse filtration of the full flow of the oil and fine filtration of a portion of the oil flow, the remainder by-passing the fine filter through a by-pass which is never closed but is constantly present during operation.

Once again, the member 74 and the wall 71 bearing its integral grooved tubular member 70 are each suitable for forming by injection moulding in a plastics material. Once again, the member 74 tapers toward the right as shown so that the filtration material is increasingly compressed toward the right of the filter. It can be seen that the filter described with reference to FIG. 12 is particularly well adapted to simple and rapid manufacture and assembly since all the parts are simply inserted in the appropriate place and the member 74 and the wall 75 are snapped together.

The progressive compression of the filter material described with reference to several of the embodiments above ensures a progressive build up of contaminant particles through the filter material leading to longer filter life.

I claim:

1. A filter unit comprising a housing having a first inlet for fluid and an outlet for fluid, means defining a flow path in said housing for fluid between the first inlet and the outlet of the housing, a course filter means and a fine filter means arranged in longitudinal alignment in said housing, said fine filter means being provided for removing particles of dimensions of 5 micrometers and greater, means for dividing said flow path into a path through said fine filter means and a permanently open by-pass path adjacent to said fine filter means and means for rejoining said path through said fine filter and said by-pass path downstream of said fine filter means with said filter unit being configurated for continuous, simultaneous flow through said by-pass path and said path through said fine filter means, including a means for directing a proportion of fluid passing through the flow path passes through said fine filter means.

2. A unit as claimed in claim 1 wherein the housing comprises a mounting plate member having an axially located threaded bore for mounting on a complimentary threaded stem and defining said first outlet and having at least one fluid inlet passageways defining said first inlet, a body portion closed at one end and mounted on said mounting plate member at the other end thereof and an axially extending tube extending from adjacent the said closed end of the body portion to said threaded bore.

3. A unit as claimed in claim 2 wherein the body portion and the mounting plate include snap coupling elements whereby the body portion and the mounting plate are snap-fitted together.

4. A unit as claimed in claim 2 wherein the by-pass is provided by one or more axially running external grooves in the tube.

5. A unit as claimed in claim 2 wherein the coarse filter means coaxially surrounds the tube adjacent the mounting plate member and the said filter means capable of filtering 5 micrometer and greater particles and coaxially surrounding the tube between the coarse filter and said closed end.

6. A unit as claimed in claim 5, wherein the by-pass extends between said fine filter means and said tube along the fine filter means with means for reconnecting a portion of fluid bypasses with fluid passed through the fine filter toward said closed end of the body portion.

7. A fine filter unit for connection between a source of fluid to be filtered and a coarse filter unit with the fine filter adapted to be mounted directly to the said source, in which the fine filter unit comprises a housing having a pair of opposed end walls, a first and a second inlet for fluid and a first and a second outlet for fluid, the first inlet and the second outlet being situated in one said end wall and the second inlet and the first outlet being situated in the other said end wall, coupling means at both of said end walls with one coupling means fluidly connecting said first inlet and second outlet to said source of fluid through filter mounting means and the other coupling means fluidly connecting second inlet and first outlet to said coarse filter unit, means in said housing defining a first flow passage for fluid between the first inlet and the first outlet of the housing, means in said housing defining a second flow passage for fluid between the second inlet and the second outlet of the housing, and a filter member in said housing for removing particles of 5 micrometers and greater, wherein said second flow passage includes a path through said filter member and a by-pass path adjacent to said filter member with said filter unit being configurated for continuous, simultaneous flow through said filter member and said by-pass path including a means for directing a portion of fluid passing through the second flow path through said filter member.

8. A unit as claimed in claim 7, wherein one of said coupling means is a threaded bore in one end wall for connecting the unit to a source of fluid to be filtered and the other said coupling means is a threaded spigot on the other end wall for connecting the unit to a coarse filter unit.

9. A unit as claimed in claim 7, wherein said means defining the second flow passage has an internally threaded bore at said second outlet constituting one said coupling means and an externally threaded stem at said second inlet constituting the other said coupling means.

10. Filtration apparatus comprising means defining a flow path between an inlet and an outlet for fluid to be filtered, said flow path constituting flow of liquid in series in which all of the fluid passes through a coarse filter member and a proportion of the fluid passes though a fine filter member for removing particles of 5 micrometers and greater, said fine filter member consisting of a roll of paper tissue material which is under radial compression which increases progressively in the flow direction, wherein the flow path includes a by-pass around said fine filter member for a proportion of fluid passing through the flow path which by-pass offers no greater resistance to flow than said fine filter member.

11. A fine filter unit for connection to a coarse filter unit providing inlet and return through flow paths, the fine filter unit comprising:
 a housing having a wall member defining a mounting face at one end of the housing, said mounting face defining an inlet for fluid to be filtered and an outlet for filtered fluid;
 a tube open at one end extending from said outlet within the housing;
 a hollow cylindrical filter member surrounding said tube within said housing for removing particles of dimensions of five micrometres and greatier;
 means defining a flow path for fluid within the housing between the inlet thereof and the outlet thereof through said filter member and through said tube;
 and means defining a by-pass flow path communicating between said inlet and said outlet which by-passes said filter member and which extends between said filter member and said tube away from said wall member along the exterior of said tube toward the open end thereof, which is designed for continuous, simultaneous fluid flow with a proportion of fluid flow through said by-pass flow path.

12. A filter unit comprising a housing having an end face containing an inlet for fluid and an outlet for fluid and having an opposite closed end, means defining a flow path in said housing for fluid between the inlet and the outlet of the housing, said flow path defining means including an axially extending tube extending from adjacent said closed end of the housing to said inlet for fluid, a coarse filter means and a fine filter means arranged in longitudinal alignment in said flow path in said housing, said fine filter means being for removing particles of dimensions of 5 micrometres and greater, means for dividing said flow path into a path through said fine filter means and a by-pass adjacent to said fine filter means, and means for rejoining said path through said fine filter means and said by-pass path downstream of said fine filter means with said filter unit being configurated for continuous, simultaneous flow through said by-pass path and said path through said fine filter means, in which a proportion only of fluid passing through the flow path passes through said fine filter means, wherein said coarse filter means and said fine filter means each surround axially separated portions of said tube and wherein said by-pass path extends between said fine filter means and said tube along the the fine filter means towards said closed end of the body portion.

* * * * *

UNITED STATES PATENT AND TRADEMARK OFFICE
CERTIFICATE OF CORRECTION

PATENT NO. : 4,832,836
DATED : May 23, 1989
INVENTOR(S) : SELSDON

It is certified that error appears in the above-identified patent and that said Letters Patent is hereby corrected as shown below:

On the title page, "12 Claims" should read --14 Claims--.

In column 11, line 4, "course" should be --coarse--;
line 10, "adjacent to" should be --around--;
line 15, "including" should be --so as to define--;
line 17, "passes" should be deleted;
line 68, "adjacent to" should be --around--.

In column 12, line 2, "including" should be --so as to define--;
line 64, "adjacent to" should be --around--.

In column 14, after line 5, the following claims should be added:

--13. A unit as claimed in claim 12, wherein said by-pass is permanently open.

14. A unit as claimed in claim 7, wherein said by-pass is permanently open.--

Signed and Sealed this

Fourteenth Day of November, 1989

*Attest:*

JEFFREY M. SAMUELS

*Attesting Officer*   *Acting Commissioner of Patents and Trademarks*